(12) United States Patent
Moffett et al.

(10) Patent No.: US 6,274,112 B1
(45) Date of Patent: *Aug. 14, 2001

(54) CONTINUOUS PRODUCTION OF SILICA-BASED MICROGELS

(75) Inventors: Robert Harvey Moffett, Landenberg, PA (US); Walter John Simmons, Martinsburg, WV (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/456,367

(22) Filed: Dec. 8, 1999

(51) Int. Cl.$^7$ .................................................. C01B 33/12
(52) U.S. Cl. ............................................................ 423/338
(58) Field of Search .................................... 423/338, 339; 516/110

(56) References Cited

U.S. PATENT DOCUMENTS

| | | | |
|---|---|---|---|
| 2,466,842 | 4/1949 | Elston | 252/313 |
| 2,999,734 | 9/1961 | Weber | 23/113 |
| 3,668,088 | * 6/1972 | Iler | 204/101 |
| 3,963,640 | 6/1976 | Smith | 252/313 |
| 4,213,950 | 7/1980 | Mahler | 423/329 |
| 4,894,357 | * 1/1990 | Hupe et al. | 502/233 |
| 4,954,220 | 9/1990 | Rushmere | 162/168.3 |
| 5,066,420 | 11/1991 | Chevallier | 252/313.2 |
| 5,176,891 | 1/1993 | Rushmere | 423/328.1 |
| 5,279,807 | 1/1994 | Moffett et al. | 423/338 |
| 5,312,595 | 5/1994 | Moffett et al. | 422/129 |
| 5,503,820 | 4/1996 | Moffett et al. | 423/333 |
| 5,648,055 | 7/1997 | Moffett et al. | 423/328.1 |
| 5,674,323 | 10/1997 | Garcia | 134/1 |
| 5,738,718 | * 4/1998 | Mori et al. | 106/481 |
| 5,759,506 | * 6/1998 | Jansen et al. | 423/338 |
| 5,853,616 | 12/1998 | Moffett et al. | 252/315.5 |
| 6,060,523 | * 5/2000 | Moffett et al. | 516/110 |
| 6,129,949 | * 10/2000 | Schwertfeger et al. | 427/220 |

FOREIGN PATENT DOCUMENTS

| | | |
|---|---|---|
| 584727 | 10/1959 | (CA) . |
| WO 91/07350 | 5/1991 | (WO) . |

* cited by examiner

*Primary Examiner*—Steven P. Griffin
*Assistant Examiner*—Edward M. Johnson

(57) ABSTRACT

A continuous process is provided for preparing silica microgels using carbon dioxide as a gel initiator at a pressure of at least about 172 kPa (about 25 psig). Consistent performance of microgel can be produced with varying production rates.

20 Claims, No Drawings

CONTINUOUS PRODUCTION OF SILICA-BASED MICROGELS

FIELD OF THE INVENTION

This invention relates to a continuous process for preparing silica-based microgels whereby consistent quality of the microgel can be achieved with varying production rates.

DESCRIPTION OF THE RELATED ART

Polysilicate microgels (i.e., aqueous solutions formed by the partial gelation of a soluble silica) are well known in the art. These microgels can be prepared by partial gelation of an alkali metal silicate by mixing the silicate with a gel initiator, aging the mixture for a short time, and then stopping further gelation by diluting the mixture. Gel initiators are also referred to as "neutralizing agents" and/or "activating agents". Mineral acids and alum are the most commonly employed gel initiators. Resulting microgels have commercial utility as a drainage and retention aid in paper making, as a flocculation agent in potable water purification plants, and in similar applications.

Several practical factors currently limit commercial use of polysilicate microgels, although they are excellent flocculents and environmentally benign. For example, microgel solutions are necessarily dilute, making it impractical to ship large volumes long distances. Therefore, microgels are typically produced at a field site by the user. Microgels also are prone to gel and to form silica deposits in equipment used to prepare the product. These problems can be overcome by equipment design and trained personnel in a factory environment, but present greater difficulty in field applications where the equipment should be relatively easy to operate and maintain.

Batch and continuous processes have been developed through the years to produce silica microgels. However, consistency in product performance has been found to vary considerably from batch-to-batch and even over relatively short periods of time with a continuous process.

Performance of silica microgels as flocculents has been shown to be highly dependent upon growing the silica microgels to the proper size before use. Two of the most important factors that affect the size of the microgel produced are pH during partial gelation of the silicate and reaction time, which includes mixing time, but is primarily aging time, or time until dilution of the silica microgel solution.

During partial gelation of the silica, pH is difficult to control when using a strong acid, such as sulfuric acid, as the gel initiator because typically about 85% of the silicate alkalinity is neutralized so the microgel can be used quickly after preparation. Small changes in the amount of initiator result in large variations in pH, which in turn result in changes in the microgel size and in microgel performance.

In a batch reactor, reaction time can be easily changed. However in a continuous reactor, reaction time is determined by the flow rate of the reactants and the volume of the reactor. If the flow rates of the reactants are changed, for example, to meet a change in demand rate for the silica microgel, then reaction time, size of the microgel formed, and therefore, microgel performance, will vary.

Moffett and Rushmere, in U.S. Pat. Nos. 5,279,807; 5,503,820; 5,648,055; and 5,853,616 disclose improved continuous processes for preparing polysilicate microgels wherein silica deposition is greatly reduced by mixing a soluble silicate solution and a gel initiator under specific conditions.

Moffett, Simmons, and Jones in U.S. patent application Ser. No. 09/119,468, filed Jul. 20, 1998 disclose a continuous process for preparing polysilicate microgels wherein elastically deformable vessels are incorporated into the process. Such vessels enable dislodging of deposits formed on vessel walls.

While the designs taught in these patents result in much decreased deposition, and have found commercial utility, there remains lack of consistent quality when production rate of microgels is varied. When flow rates of reactants are changed to meet varying demand production rates, aging time changes and hence, size of the microgel formed and performance can vary. Thus, the user must accommodate for varying performance.

A continuous process that could reliably produce polysilicate microgels of consistent quality having consistent performance at different production rates in the same equipment to meet varying customer demands would have high utility.

SUMMARY OF THE INVENTION

The present invention provides a continuous process for preparing polysilicate microgels comprising:

(a) contacting a feed stream comprising a silica source, wherein the silica source is selected from the group consisting of an aqueous solution of a water soluble silicate, a colloidal silica sol, and combinations thereof, with a feed stream comprising carbon dioxide in a contacting vessel to produce a mixture; and (b) aging the mixture in an aging vessel to partially gel the mixture to produce an aged mixture, wherein the contacting step, the aging step, or both, are performed at a pressure of at least about 172 kPa (about 25 psig).

The stream comprising carbon dioxide may contain free carbon dioxide, typically in the form of a gas or liquid, or in the form of a material that will release carbon dioxide under reaction conditions. Mixtures of carbon dioxide with other components are also contemplated.

The present invention and its particular embodiments provide advantages in a continuous process for preparing silica microgels, which include better pH control during the step where the feed streams are contacted; more consistent microgel size and performance; elimination of strong mineral acids in the process, which provides safety benefits as well as lower equipment costs; improved ability to remove silica deposits; and efficient system purge in the event water supply is lost.

DETAILED DESCRIPTION OF THE INVENTION

Polysilicate microgels are aqueous solutions formed by the partial gelation of a silica source, for example, a water soluble silicate, a colloidal silica sol, or combinations thereof.

Water soluble silicates include alkali metal silicates and polysilicates, such as sodium silicate, having in its most common form one part $Na_2O$ to 3.3 parts $SiO_2$ by weight. Microgels formed from soluble silicates typically are composed of water and linked silica particles having a diameter of 1 to 5 nm and a surface area of at least 500 $m^2/g$, more typically of at least 1000 $m^2/g$. The particles are linked together during preparation (i.e., during partial gelation) to form aggregates having three-dimensional networks and chains. Preferably, the silica source is an aqueous solution of a water soluble silicate.

Colloidal silica sols are commercially available, for example, from E. I. duPont de Nemours and Company, Inc., sold under the name Ludox® Colloidal Silica. Silica sols useful in this invention are composed of water and discreet silica particles having a diameter of 4 to 60 nm, preferably less than 50 nm. The sol particles also link together during partial gelation to form aggregates having three-dimensional networks and chains. Microgels formed from silica sols will typically have a surface area in the range of about 50 to 750 $m^2/g$.

At a pH below 5, polysilicate microgels sometimes are referred to as polysilicic acid microgels. As the pH value is raised, these products can contain mixtures of polysilicic acid and polysilicate microgels, the ratio being pH-dependent. As used herein, the term "polysilicate microgel" or "silica microgel" includes such mixtures of polysilicic acid and polysilicate microgels.

Polysilicate microgels frequently are modified by incorporating aluminate ions into their structure. The aluminum may be present throughout the polysilicate aggregates, or only on their surface, depending on where the aluminum source is added to the process. Aluminum may be added to increase the rate of microgel formation, and thus to decrease the aging time. Aluminum added as aluminate also allows the microgel to retain its charge at low pH conditions. Silica sols may have aluminum incorporated in the sol particles. As used herein, the term "polysilicate microgel" or "silica microgel" includes polysilicate microgels containing aluminum, which are sometimes referred to in the art as polyaluminosilicate microgels.

Contacting

In the present invention, a feed stream comprising a silica source, the "silica feed stream", is contacted with a feed stream comprising carbon dioxide. The silica source is selected from the group consisting of an aqueous solution of a water soluble silicate, a colloidal silica sol, and combinations thereof. The term "contacting" refers to combining the two feed streams such that the streams become mixed. Mixing is typically accomplished by turbulent flow of the feed streams. The silica feed stream can comprise any conventional water soluble silicate solution and/or colloidal silica.

When the silica feed stream comprises a water soluble silicate solution, the silica stream should have a silica concentration in the range of 0.5 to 15%, preferably 1% to 10%, and most preferably 1 to 5%, by weight. The microgel generally will be formed too slowly for practical use at concentrations below 0.5%. Above 15% silica, the rate of gelation is too fast to effectively control when using a water soluble silicate. Commercial silicate solutions having higher silica concentrations can be used with appropriate dilution by adding water to reduce the silica concentration.

When the silica feed stream comprises a colloidal silica sol, in the absence of a water soluble silicate, the silica stream can be used without dilution. The silica concentration in the feed stream can be the same as the silica concentration in the silica sol, or less. Preferably the silica concentration in the silica feed stream is in the range of 15% to 50%, by weight, when a colloidal silica sol is used, in the absence of a water soluble silicate.

Contacting the feed streams can be carried out in any suitable contacting vessel, such as a tank, pipe, tube, hose, continuous stirred tank, plug flow reactor, tubing, or combinations thereof. The term "vessel" denotes a hollow subject used for fluid, especially liquid.

The silica feed stream is contacted with a feed stream comprising carbon dioxide as a gel initiator in a continuous process, which initiates formation of the microgel. While it is preferred to feed carbon dioxide as free carbon dioxide in the form of a gas or liquid in the feed stream, the feed stream can also contain carbon dioxide in the form of a material that will release carbon dioxide under reaction conditions, for example, sodium bicarbonate. Other components, liquids or gases may also be present in the carbon dioxide feed stream.

The flow rates of the silica and carbon dioxide feed streams may be controlled volumetrically (typically within the pH range of 6 to 10) due to the buffering effect of resulting carbonates. Volumetric control offers the advantage of avoiding pH sensors, which may require frequent cleaning, calibration, and replacement.

Additional gel initiators may be added, for example, aluminum compounds, especially when preparing polyaluminosilicate microgel solutions, which may lower the pH. Other gel initiators may also be fed to the reactor, either with the carbon dioxide feed stream, or as a separate stream. These include for example, inorganic and organic acids, such as sulfuric and acetic acids, acid salts, such as borax, sodium bisulfite, ammonium sulfate, alkali metal salts of amphoteric metal acids, such as sodium aluminate and certain organic compounds, such as organic anhydrides, amides and esters. A more complete list of gel initiators is provided in Rushmere, U.S. Pat. No. 4,954,220, incorporated herein by reference.

The contacting step, subsequent aging step or both steps should be performed at a pressure of at least about 172 kPa (about 25 psig), and typically less than 13,800 kPa (about 2000 psig), the upper limit set more by practicality and economics than by process limitations. Preferably the contacting step is performed at a pressure in the range of about 344 to 1380 kPa (about 50 to 200 psig). Surprisingly it has been found that at the elevated pressure, continuous production of silica microgels having a consistent size is achieved, even at varying flow rates. For example, production rates can be varied over a 3-fold range without the need to vary either silica concentration or $CO_2$ flow rate.

The carbon dioxide feed stream is contacted with the silica feed stream such that the amount of carbon dioxide added ranges from slightly less than stoichiometric to an excess, based on the amount needed to neutralize the alkalinity of the silica feed stream. Slightly less than stoichiometric will typically mean at least 80% of the stoichiometric amount, and preferably at least 90% of the stoichiometric amount needed to neutralize the silica alkalinity. The amount of carbon dioxide added can be less than 80% of the stoichiometric amount needed to neutralize the silica alkalinity when carbon dioxide is used in combination with other gel initiators. Preferably there is at least a stoichiometric amount added for more consistent pH control. More preferably $CO_2$ is added in an amount corresponding to 100 to 500% of the stoichiometric amount needed to neutralize the silica alkalinity.

By silica alkalinity, it can be the alkalinity of an aqueous solution of a water soluble silicate, e. g., of a solution of an alkali metal silicate, such as sodium silicate. These solutions are basic and gel initiators are typically acidic. Water soluble silicates are distinguished by their ratio of silica to alkali, wherein the alkali is of the formula $M_2O$ and M is typically Na, K, or $NH_4$. Alternatively, silica alkalinity can mean the alkalinity of a colloidal silica sol. In a silica sol, the silica particles are dispersed in an alkaline medium, which stabilizes the particles to gelation. The alkaline medium can contain, for example, sodium or ammonium hydroxide.

Preferably carbon dioxide will be used in the absence of other gel initiators and the feed rate of carbon dioxide will be in excess of the solubility of carbon dioxide in water at the given pressure and temperature. As temperature increases, solubility of carbon dioxide decreases. The temperature for carrying out either step is typically in the range of from 0° C. to 50° C.

Optionally, an aluminum salt or an alkali metal aluminate, is conveniently added as a soluble component in the silicate solution, or may be added as a separate stream to the mixture. Excellent polyaluminosilicate microgels contain an $Al_2O_3/SiO_2$ mole ratio in the range of 1:1500 to 1:25, preferably 1:1250 to 1:50. Generally up to 25% of surface silicon can be replaced by aluminum.

While any conditions may be employed in practicing the invention for contacting the feed streams, turbulent conditions are preferred, such that the feed streams are contacted at a Reynolds number of at least 1,000, and preferably greater than 6,000.

After the contacting step, when the silica feed stream comprises a water soluble silicate solution, the mixture should have a silica concentration of 0.5 to 15 wt %, preferably 1 to 10 wt %, most preferably 1 to 5 wt %. When the silica feed stream comprises a colloidal silica sol in the absence of a water soluble silicate, the mixture can have a higher silica concentration, i. e., a silica concentration equal to the silica concentration in the silica sol or less, preferably a silica concentration in the range of 15% to 50%, by weight. The pH should be in a range of 6 to 10, preferably 6.5 to 7.5, when carbon dioxide is used in the absence of additional gel initiators.

Aging

The mixture is aged in an aging vessel for a time sufficient to achieve the desired level of partial gelation, which usually takes at least 10 seconds and generally does not take longer than 15 minutes. Partial gelation produces an aged mixture, which is an aggregate of three-dimensional networks and chains of high surface area silica particles known in the art as polysilicate microgels. This aging step is preferably performed at a pressure greater than about 172 kPa (about 25 psig) and typically less than 13,800 kPa (2000 psig). Preferably the mixture is aged at a pressure in the range of 344 to 1380 kPa (50 to 200 psig).

The extent of desired partial gelation varies with the selected ingredients and the application, but generally is achieved within 10% to 90% of the time that produces complete gelation. Thus, an artisan can readily determine gel time, and adjust the silica concentration to achieve the desired partial gelation. Alternatively, length and/or diameter of the aging vessel, temperature, and flow rates, may be optimized for a particular application. Temperature during aging typically is in the range of 0° C. to 50° C.

In a continuous process, aging occurs as the mixture passes through an aging vessel, which is typically an elongated vessel, and is essentially completed when the mixture reaches the vessel discharge. The aging vessel can be any suitable vessel, such as a pipe, tube, hose, plug flow reactor, tubing, or combinations thereof. The aging vessel typically has a constant diameter, with the diameter and length being selected to provide the needed residence time for the mixture to "age" to the desired extent. A typical aging vessel has a diameter in the range of 0.5 cm to 25 cm (¼ to 10 inches), and a length of 60 cm to 150 m (2 to 500 feet), to provide a residence time of 10 seconds to 15 minutes. There generally is no advantage to employing a residence time longer than 15 minutes.

The contacting and/or aging vessel is preferably an elastically deformable vessel (e. g., a pipe or tube), as described in U.S. patent application Ser. No. 09/119,468, filed Jul. 20, 1998. Therein is described a continuous process for preparing polysilicate microgels wherein the elastically deformable vessel is described as being temporarily deformed from time-to-time to dislodge deposits that form on the vessel walls. The vessel is constructed of a material having (i) an elasticity greater than that of silica deposits, and (ii) surface characteristics such that deformation of the vessel will overcome adhesive forces between the vessel and the deposits, thereby causing the deposits to be dislodged when the vessel is deformed. Use of carbon dioxide at pressures of at least about 172 kPa (about 25 psig) is especially beneficial for eliminating silica deposits. The dislodged deposits are purged from the vessel by the mixture of the silica stream and carbon dioxide as the mixture continuously passes through the vessel. As the deposits are composed of silica, there is no need to segregate and remove them from the mixture exiting the vessel for many applications. Advantages of using deformable vessels are especially apparent when applied to the contacting and early aging period of the process where deposits are particularly prone to form.

While the use of pressure in the present invention will contribute to deforming a deformable vessel, when such a vessel is used, other means of deforming the contacting and/or aging vessel may also be used. These include mechanical means and vibrational means. Mechanical means include squeezing, stretching, or bending and releasing the walls of a vessel by a roller, press or other mechanical device, or by varying external pressure on a vessel by a surrounding fluid. Vibrational means includes use of sonic or ultrasonic sound waves.

Use of carbon dioxide also greatly aids in purging the reaction system, which includes the contacting vessel and the aging vessel, to dislodge deposits that form on the vessel walls. That is, purging, or flushing, occurs when the pressure is reduced from the reaction pressure of at least about 172 kPa (about 25 psig) to ambient. The process of this invention optionally further comprises a step that involves purging of the contacting and/or aging vessels by dislodging deposits that form on the vessel walls by rapidly decreasing the pressure in the vessels. The reduction in pressure causes a change in solubility of carbon dioxide, which generates large volumes of gas that rapidly purge the system. This is particularly advantageous when using a deformable vessel as the contacting vessel and/or the aging vessel.

Industrial Use

The aged mixture or polysilicate microgel is generally treated to arrest, or minimize, further gel formation. When the silica feed stream comprises a solution of a water soluble silicate, this treatment may be a simple dilution step that reduces the silica concentration to less than about 10%, preferably less than 5%, and most preferably less than 2%, by weight, to produce a diluted mixture, or diluted polysilicate microgel. When the silica feed stream comprises a colloidal silica sol in the absence of a water soluble silicate, a dilution step may also be used. Alternatively, the treatment may be a pH adjustment step, or a combination of dilution and pH adjustment steps, whereby gelation is halted or retarded or both. In a pH adjustment step, pH is typically adjusted to less than 3 or greater than 9 to minimize further gel formation. Other techniques known in the art may be selected to arrest gel formation as well.

The treated microgel, that is, after dilution or pH adjustment may then be stored or consumed in its intended use. Alternatively, if the microgel is consumed immediately, or if further gelation will be within acceptable limits for the intended application, it may not be necessary to dilute or adjust pH of the microgel. If desired, the aged microgel may be filtered to remove unacceptably large silica deposits that were dislodged while practicing the invention.

Polysilicate microgels prepared in accordance with the invention may be used in conventional applications consuming such microgels, as well as in new applications rendered practical because the microgels can be reliably produced in the field. For instance, the microgels may be used as a flocculating agent to remove solids from aqueous suspensions, or as a paper retention aid, frequently in conjunction with other polymers and/or chemicals used for that purpose.

Having described the invention, it now will be illustrated, but not limited, by the following examples.

EXAMPLES

Example 1

This example demonstrates how the silica stream flow rate may be varied resulting in aging times that vary without substantially affecting the microgel size when using $CO_2$ as a gel initiator at a pressure of 75 psig. This example also demonstrates how the gel initiator to silica ratio may be significantly changed without substantially affecting the microgel size when using $CO_2$ as a gel initiator at a pressure of 75 psig.

A polysilicate microgel was prepared by mixing a solution of sodium silicate with carbon dioxide. The sodium silicate solution had a 3.22 ratio of $Na_2O:SiO_2$ and contained 28.5 wt % $SiO_2$. The silicate solution was diluted in-line with a sufficient amount of water to lower the $SiO_2$ concentration to 2.4 wt % $SiO_2$, which was then fed continuously into 91.4 m (300 feet) of an elastically deformable vinyl hose having an internal diameter of 3.8 cm (1.5 inches). The flow rate of the dilute silicate solution was varied to achieve different reaction times. As used herein, "reaction time" means the theoretical aging time, or "aging time" based on the flow rate of the dilute silicate solution. Carbon dioxide ($CO_2$) was fed to the hose at a flow rate of 340 slpm. The amount of $CO_2$ added ranged from slightly less than stoichiometric to an excess, based on the amount needed to completely neutralize the silicate alkalinity, depending on the flow rate of the silicate solution. Pressure within the hose was maintained at 516 kPa (75 psig) by a control valve located at the discharge end of the hose. The pH and the time for the inception of visible gelation, that is, "gel time" of the 2.4 wt % silica microgel product were measured at the discharge end of the hose.

Samples of the silica microgel product were prepared for viscosity measurements by immediately diluting the 2.4 wt % microgel product to 1 wt % $SiO_2$ and lowering the pH to 2. Viscosity was measured using a Cannon Fenske size 50 viscometer tube. Average microgel size (diameter in nm) was estimated by comparing viscosity measurements with viscosity measurements of a series of silica microgels for which particle sizes were measured using dynamic light scattering analysis. Viscosity measurements of the series of microgels were correlated with particle size measured using the light scattering analysis.

Dynamic light scattering analysis was performed using a Brookhaven Instrument light scattering goniometer, model BI-200SM. Measurements of the microgels were conducted at room temperature using an argon-ion laser with a wavelength of 488 nm operating at 200 mW power. Light scattering intensity measurements were made at different angles and the data were analyzed using a Zimm plot.

Results are provided in Table 1.

TABLE 1

| Dilute silicate solution, l/m (gpm)* | Aging time, min. | pH | Gel time, min. | Viscosity, % DI $H_2O$ | Est. Avg. Microgel Diameter, nm |
|---|---|---|---|---|---|
| 46.9 (12.4) | 2.2 | 7.1 | 1.5 | | |
| 39.0 (10.3) | 2.7 | 6.8 | 1.7 | 124 | 65 |
| 31 (8.2) | 3.4 | 6.7 | 1.9 | | |
| 23 (6.2) | 4.4 | 6.8 | 2.0 | 122 | 60 |
| 16 (4.1) | 6.7 | 6.8 | 1.7 | | |

*l/m = liters per minute; gpm = gallons per minute

As can be seen in Table 1, gel times and pH of the microgel were very consistent indicating consistent microgel size.

Comparative Example

This example demonstrates how varying the aging time when using sulfuric acid as a gel initiator results in significant changes in the microgel size and hence its properties. This example also demonstrates how small changes in the gel initiator to silica ratio when using sulfuric acid results in large changes in the microgel size and properties.

For comparison, a polysilicate microgel was prepared by mixing 5N $H_2SO_4$ with 983 grams of dilute sodium silicate to provide a microgel solution containing 2.4 wt % $SiO_2$. Two separate runs were performed, at 41.5 ml and 41.0 ml $H_2SO_4$, respectively. The mixture was allowed to age to provide similar reaction times as in Example 1. The pH was measured after 1 minute of aging. Samples were withdrawn from the mixture and diluted to 1 wt % $SiO_2$ and adjusted to pH 2 at the noted aging times. Viscosity and estimated diameter for the aged samples were determined as in Example 1. Gel time for each run is also provided.

TABLE 2

| 5N $H_2SO_4$, ml | pH @ 1 min. | Gel time, min. | Aging time, min. | Viscosity % DI $H_2O$ | Est. Avg. Microgel Diameter, nm |
|---|---|---|---|---|---|
| 41.5 | 8.77 | 7.5 | 2.2 | 120 | 50 |
| | | | 3.4 | 132 | 90 |
| | | | 6.7 | 201 | >160 |
| 41.0 | 8.89 | 11.25 | 2.2 | 117 | 40 |
| | | | 3.4 | 124 | 65 |
| | | | 6.7 | 152 | 130 |

As can be seen from Table 2, use of sulfuric acid as the gel initiator to prepare silica microgels provided microgel products with significantly different viscosities and particle sizes at different aging times. Also, a small difference in the amount of sulfuric acid resulted in a large difference in gel time and differences in viscosity and particle size. Comparing with the results in Table 1, it can be seen that use of carbon dioxide as the gel initiator provided a much more consistent product.

In Example 1 the amount of initiator ($CO_2$) changes over a three-fold range relative to the silicate and little variation in viscosity and average microgel diameter was observed. In contrast, in the Comparative Example, the amount of initiator (sulfuric acid) changes only by 1.2% relative to the silicate and large changes in viscosity and average microgel diameter were observed.

Example 2

This example demonstrates how a more consistent product is produced by conducting the contacting and aging steps at pressures greater than 172 kPa (about 25 psig).

The process of Example 1 was repeated at varying pressures. A sodium silicate solution having a 3.22 ratio of $Na_2O:SiO_2$ containing 28.5 wt % $SiO_2$ was diluted in-line with a sufficient amount of water to lower the $SiO_2$ concentration to 2.1 wt % $SiO_2$. $CO_2$ was added at a rate of 270 slpm. The flow rate of dilute $SiO_2$ was 28 liters per minute (7.5 gpm). The $CO_2$ and silicate solution were continuously fed into 91.4 m (300 feet) of vinyl hose having an internal diameter of 3.8 cm (1.5 inches). Pressure within the hose was maintained by a control valve located at the discharge end of the hose. The pH and the gel time of the 2.1 wt % sol were measured at the discharge end of the hose.

TABLE 3

| Pressure, kPa (psig) | pH | Gel time, min. |
| --- | --- | --- |
| 619 (90) | 6.9 | 1.2 |
| 516 (75) | 6.9 | 1.3 |
| 344 (50) | 6.9 | 1.3 |
| 172 (25) | 7.2 | 2.2 |
| 103 (15) | 7.8 | 2.8 |

As can be seen from Table 3 gel times and pH were most consistent at pressures of about 172 kPa (about 25 psig) and above. Consistent gel times and pH indicate consistent microgel size.

What is claimed is:

1. A continuous process for preparing polysilicate microgels comprising:
   (a) contacting a feed stream comprising a silica source, wherein the silica source is selected from the group consisting of an aqueous solution of a water soluble silicate and a colloidal silica sol, with a feed stream comprising carbon dioxide in a contacting vessel to produce a mixture; and
   (b) aging the mixture in an aging vessel to partially gel the mixture to produce an aged mixture,
   wherein the contacting step, the aging step, or both, is performed at a pressure of at least about 172 kPa.

2. The process of claim 1 wherein the silica source is an aqueous solution of a water soluble silicate and further comprising diluting the aged mixture to a silica concentration of less than 10%, by weight, to produce a diluted mixture.

3. The process of claim 2 further comprising adjusting the pH of the diluted mixture to a pH of less than 3 or greater than 9.

4. The process of claim 1 further comprising adjusting the pH of the aged mixture to a pH of less than 3 or greater than 9.

5. The process of claim 1 wherein the silica source is an aqueous solution of a water soluble silicate and the concentration of silica in the feed stream comprising a silica source is in the range of 0.5 to 15%, by weight.

6. The process of claim 5 wherein the concentration of silica in the feed stream comprising a silica source is in the range of 1 to 10%, by weight.

7. The process of claim 1 wherein carbon dioxide is present in an amount that is at least 80% of the stoichiometric amount needed to neutralize the alkalinity of said silica.

8. The process of claim 1 wherein carbon dioxide is present in at least a stoichiometric amount needed to neutralize the alkalinity of said silica.

9. The process of claim 1 wherein the contacting step, the aging step, or both are performed at a pressure in the range of about 344 kPa to 1380 kPa.

10. The process of claim 1 wherein the contacting vessel, the aging vessel, or both are elastically deformable vessels.

11. The process of claim 10 further comprising deforming the elastically deformable vessel from time-to-time to dislodge deposits that form on the vessel walls.

12. The process of claim 1 further comprising dislodging deposits that form on the walls of the contacting vessel, the aging vessel, or both, by rapidly decreasing the pressure in the vessel from a pressure of greater than about 172 kPa to ambient pressure.

13. A continuous process for preparing polysilicate microgels comprising:
   (a) contacting a feed stream comprising a silica source, wherein the silica source is an aqueous solution of a water soluble silicate, with a feed stream comprising carbon dioxide in a contacting vessel to produce a mixture; and
   (b) aging the mixture in an aging vessel to partially gel the mixture to produce an aged mixture,
   wherein the concentration of silica in the feed stream comprising the silica source is in the range of 0.5 to 15%, by weight; carbon dioxide is present in an amount that is at least 80% of the stoichiometric amount needed to neutralize the alkalinity of said silica, and said process is carried out at a pressure in the range of about 344 kPa to 1380 kPa.

14. The process of claim 13 further comprising diluting the aged mixture to a silica concentration of less than 5.0%, by weight, to produce a diluted mixture.

15. The process of claim 14 further comprising adjusting the pH of the diluted mixture to a pH of less than 3 or greater than 9.

16. The process of claim 13 further comprising adjusting the pH of the mixture to a pH of less than 3 or greater than 9.

17. The process of claim 13 wherein carbon dioxide is present in at least a stoichiometric amount needed to neutralize the silica alkalinity.

18. The process of claim 13 wherein the feed stream comprising a silica source and the feed stream comprising carbon dioxide are simultaneously introduced into a mixing zone where the feed streams converge at an angle not less than 30°.

19. The process of claim 18 wherein the contacting vessel, the aging vessel, or both are elastically deformable vessels and further comprising deforming the elastically deformable vessels from time-to-time to dislodge deposits that form on the vessel walls, and purging the deposits from the vessels.

20. A continuous process for preparing polysilicate microgels comprising:
   (a) contacting a feed stream comprising a silica source, wherein the silica source is an aqueous solution of a water soluble silicate, with a feed stream comprising carbon dioxide in a contacting vessel to produce a mixture having a pH in the range of 6.5 to 7.5;
   (b) aging the mixture in an aging vessel to partially gel the mixture to produce an aged mixture;
   (c) diluting the aged mixture to a silica concentration of less than 5%,
   wherein carbon dioxide is present in an amount that is at least the stoichiometric amount needed to neutralize the alkalinity of said silica, and said process is carried out at a pressure in the range of about 344 kPa to 1380 kPa.

* * * * *